United States Patent
Yoshizawa et al.

(10) Patent No.: US 8,436,124 B2
(45) Date of Patent: May 7, 2013

(54) URETHANE RESIN, FIXING MEMBER, AND IMAGE FORMING APPARATUS

(75) Inventors: Hisae Yoshizawa, Kanagawa (JP); Hiroshi Saegusa, Kanagawa (JP); Kaoru Torikoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 81 days.

(21) Appl. No.: 13/049,239

(22) Filed: Mar. 16, 2011

(65) Prior Publication Data
US 2012/0022215 A1    Jan. 26, 2012

(30) Foreign Application Priority Data
Jul. 22, 2010   (JP) .................................. 2010-164426

(51) Int. Cl.
*C08G 18/00* (2006.01)
*C08G 18/06* (2006.01)
*C08G 18/68* (2006.01)
*C08G 77/388* (2006.01)

(52) U.S. Cl.
USPC .............................. 528/44; 525/100; 525/123

(58) Field of Classification Search ........................ None
See application file for complete search history.

(56) References Cited

U.S. PATENT DOCUMENTS

| | | | |
|---|---|---|---|
| 5,646,228 A * | 7/1997 | Gras et al. ......................... | 528/45 |
| 6,620,877 B2 * | 9/2003 | Klanica et al. ................... | 524/506 |
| 2002/0012550 A1 | 1/2002 | Nakano | |
| 2007/0111874 A1 | 5/2007 | Sugimura et al. | |
| 2008/0285133 A1 * | 11/2008 | Yoneyama et al. ............. | 359/580 |
| 2010/0063222 A1 * | 3/2010 | Oikawa et al. .................. | 525/474 |
| 2010/0075245 A1 * | 3/2010 | Watanabe et al. ........ | 430/123.41 |
| 2010/0093951 A1 * | 4/2010 | Oikawa et al. .................. | 525/474 |

FOREIGN PATENT DOCUMENTS

| | | |
|---|---|---|
| JP | A-10-142990 | 5/1998 |
| JP | A-11-231684 | 8/1999 |
| JP | A-2003-84546 | 3/2003 |
| JP | A-2003-91141 | 3/2003 |
| JP | A-2003-98804 | 4/2003 |
| JP | A-2003-140418 | 5/2003 |
| JP | A-2006-39188 | 2/2006 |
| JP | A-2007-31690 | 2/2007 |

* cited by examiner

*Primary Examiner* — Robert S Loewe
(74) *Attorney, Agent, or Firm* — Oliff & Berridge, PLC

(57) ABSTRACT

A urethane resin that is formed by polymerizing an acrylic resin including a hydroxyl group and an isocyanate is provided. The urethane resin has a Martens hardness of 1 N/mm$^2$ or more and 200 N/mm$^2$ or less at 150° C. and a recovery rate of 80% or more and 100% or less at 150° C.

18 Claims, 6 Drawing Sheets

URETHANE RESIN, FIXING MEMBER, AND IMAGE FORMING APPARATUS

CROSS-REFERENCE TO RELATED APPLICATIONS

This application is based on and claims priority under 35 USC 119 from Japanese Patent Application No. 2010-164426 filed Jul. 22, 2010.

BACKGROUND (i) Technical Field

The present invention relates to a urethane resin, a fixing member, and an image forming apparatus.

(ii) Related Art

To improve the long-life of a fixing member, there is a method in which the surface of the fixing member is made hard to thereby enhance the resistance to scratching of the fixing member.

SUMMARY

According to an aspect of the invention, there is provided a urethane resin that is formed by polymerizing an acrylic resin including a hydroxyl group and an isocyanate and that has a Martens hardness of 1 $N/mm^2$ or more and 200 $N/mm^2$ or less at 150° C. and a recovery rate of 80% or more and 100% or less at 150° C.

BRIEF DESCRIPTION OF THE DRAWINGS

Exemplary embodiments of the present invention will be described in detail based on the following figures, wherein.

DETAILED DESCRIPTION

Urethane Resin

Figure 1:
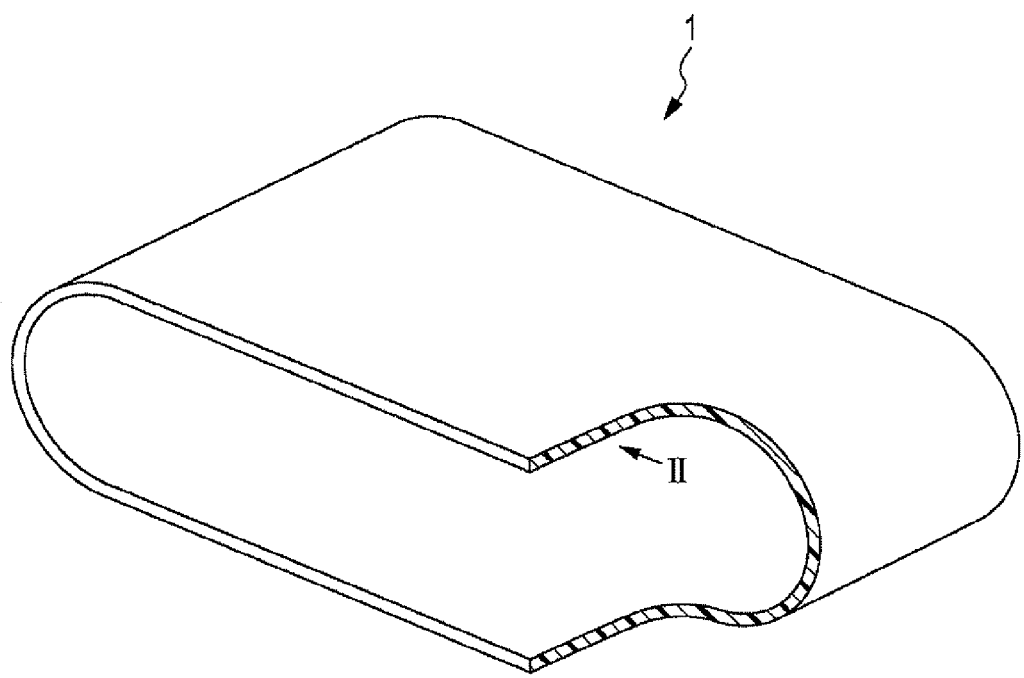
FIG. 1 is a perspective view schematically illustrating the configuration of an endless belt in an exemplary embodiment.

A urethane resin according to an exemplary embodiment is formed by polymerizing an acrylic resin including a hydroxyl group and an isocyanate and the urethane resin has a Martens hardness of 1 $N/mm^2$ or more and 200 $N/mm^2$ or less at 150° C. and a recovery rate of 80% or more and 100% or less at 150° C.

A urethane resin according to an exemplary embodiment, which has a Martens hardness in the range and a recovery rate in the range at a high temperature of 150° C., probably does not directly bounce in response to an impact even in a high-temperature environment but flexibly depresses once to reduce the impact and then recovers from such a depression and goes back to its original shape due to excellent resilience. Accordingly, such a urethane resin has an excellent heat resistance and, in a high-temperature environment, a high resistance to scratching (resistance to becoming scratched) and quick removal of scratches (removal of scratches having been formed) are probably achieved.

Thus, for example, when a urethane resin according to an exemplary embodiment is used for a fixing member of an image forming apparatus, the fixing member has such an excellent heat resistance that the fixing member can endure heating in a fixing device. In addition, when an impact is applied to the fixing member by the contact between the fixing member and a recording medium such as paper, scratching is suppressed due to a high resistance to scratching (resistance to becoming scratched) and quick removal of scratches (removal of scratches having been formed) in a high-temperature environment.

Martens Hardness

A urethane resin according to an exemplary embodiment has a Martens hardness of 1 $N/mm^2$ or more and 200 $N/mm^2$ or less at 150° C. and, preferably 10 $N/mm^2$ or more and 100 $N/mm^2$ or less.

When a urethane resin has a Martens hardness of less than the lower limit (1 $N/mm^2$) of the range or more than the upper limit (200 $N/mm^2$) of the range at 150° C., the urethane resin has a poor resistance to scratching in a high-temperature environment. When such a urethane resin is used for, for example, a fixing member of an image forming apparatus, images formed with the apparatus may have defects.

Recovery Rate

A urethane resin according to an exemplary embodiment has a recovery rate of 80% or more and 100% or less at 150° C. and, preferably 90% or more and 100% or less. The recovery rate is an indicator of the capability of recovering from scratches (the degree of recovery from scratches caused by an external force) of such a urethane resin.

When a urethane resin has a recovery rate less than the lower limit (80%) at 150° C., the urethane resin does not exhibit the capability of recovering from scratches in a high-temperature environment.

Measurement Method (Recovery Rate and Martens Hardness)

A FISCHERSCOPE HM2000 (manufactured by Fischer Instruments K.K.) is used as a measurement apparatus. A urethane resin layer formed by applying a urethane resin to a polyimide film is fixed on a slide glass by using an adhesive agent and placed on a hot stage of the measurement apparatus. The urethane resin layer is subjected to an increasing load up to 0.5 mN over 15 seconds while being kept at 150° C. and the urethane resin layer is held under the load of 0.5 mN for 5 seconds. At this time, the maximum displacement of the urethane resin layer is defined as h1. After that, the load is decreased to 0.005 mN over 15 seconds and the urethane resin layer is held under the load of 0.005 mN for a minute. At this time, the displacement of the urethane resin layer is defined as h2. The recovery rate [(h1−h2)/h1] is then calculated. In addition, the Martens hardness is determined from a load displacement curve obtained at this time.

Hereinafter, the composition of a urethane resin according to an exemplary embodiment will be described.

As described above, a urethane resin according to an exemplary embodiment is formed by polymerizing an acrylic resin including a hydroxyl group and an isocyanate. The following should not be understood as limitation on the invention: in view of controlling the Martens hardness and the recovery rate of a urethane resin at 150° C. within the above-described ranges, the urethane resin is preferably formed by polymerizing at least compositions (a), (b), and (c) below or the urethane resin is preferably formed by polymerizing at least compositions (a') and (c) below.

(a) Acrylic resin in which a ratio [A]/([A]+[B]) is 80% or more or about 80% or more and 100% or less where [A] represents the molar content of hydroxyl groups of side chains having less than 10 carbon atoms and [B] represents the molar content of hydroxyl groups of side chains having 10 or more carbon atoms; and a hydroxyl value is 70 mgKOH/g or more and 400 mgKOH/g or less, or about 70 mgKOH/g or more and about 400 mgKOH/g or less (b) At least one silicone selected from the compounds represented by a general formula (1) below (c) Isocyanate (a') At least one acrylic resin selected from the compounds represented by a general formula (2) below in which a ratio [A]/([A]+[B]) is 80% or more or about 80% or more and 100% or less where [A] represents the molar content of hydroxyl groups of side chains having less than 10 carbon atoms and [B] represents the molar content of hydroxyl groups of side chains having 10 or more carbon atoms; and a hydroxyl value is 70 mgKOH/g or more and 400 mgKOH/g or less, or about 70 mgKOH/g or more and about 400 mgKOH/g or less General formula (1)

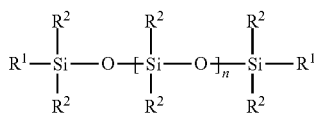

In the general formula (1), $R^1$ represents an amino group, a hydroxyl group, a methoxy group, or an ethoxy group; and $R^2$ represents a methyl group, a phenyl group, or an ethyl group. The number (n) of the groups within the parentheses —[Si$(R^2)_2$—O]— in the general formula (1) is not particularly limited; however, the number is preferably 3 or more and 1,000 or less.

General formula (2)

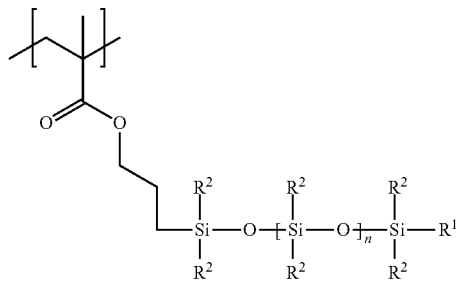

In the general formula (2), $R^1$ represents an amino group, a hydroxyl group, a methoxy group, or an ethoxy group; and $R^2$ represents a methyl group, a phenyl group, or an ethyl group. The number (n) of the groups within the parentheses —[Si$(R^2)_{2-0}$]— in the general formula (2) is not particularly limited; however, the number is preferably 3 or more and 1,000 or less.

Side chains having less than 10 carbon atoms are defined as "short side chains". Side chains having 10 or more carbon atoms are defined as "long side chains". Short side chains preferably have 6 or less carbon atoms.

In a urethane resin formed by polymerizing the compositions (a), (b), and (c) and a urethane resin formed by polymerizing the compositions (a') and (c), since the compositions (a), (b), and (c) and the compositions (a') and (c) are respectively polymerized and the hydroxyl value of the acrylic resins (a) and (a') are in the above-described range, the urethane resins have a high crosslinking density and hence probably has a high heat resistance. Such urethane resins probably do not directly bounce in response to an impact (when such a urethane resin is used for, for example, a fixing member of an image forming apparatus, an impact applied to the fixing member by the contact between the fixing member and a recording medium such as paper) even in a high-temperature environment but flexibly depresses once to reduce the impact and then recovers from such a depression and goes back to its original shape due to excellent resilience. Accordingly, such a urethane resin has an excellent heat resistance and, in a high-temperature environment, a high resistance to scratching (resistance to becoming scratched) and quick removal of scratches (removal of scratches having been formed) are probably achieved.

In addition, in such a urethane resin, since the (b) silicone or the (a') acrylic resin having silicone chains as side chains are polymerized, a high resistance to scratching and quick removal of scratches in a high-temperature environment are probably maintained for a long period of time.

In a urethane resin according to an exemplary embodiment, the mass percentage of a monomer having a silicone chain (Si—O) with respect to the entire monomers used for the polymerization of the urethane resin is desirably 1 mass % or more and 50 mass % or less, or about 1 mass % or more and about 50 mass % or less.

The term "mass percentage" represents, for example, when the compositions (a), (b), and (c) are polymerized to form a urethane resin, the mass percentage of the (b) silicone monomer with respect to the entire monomers. When the compositions (a') and (c) are polymerized to form a urethane resin, the term "mass percentage" represents the mass percentage of a monomer having a silicone chain (Si—O) in the monomers used for the synthesis of the (a') acrylic resin with respect to the entire monomers. When the compositions (a'), (b), and (c) are polymerized to form a urethane resin, the term "mass percentage" represents the mass percentage of the (b) silicone monomer and a monomer having a silicone chain (Si—O) in the monomers used for the synthesis of the (a') acrylic resin, with respect to the entire monomers.

Control of Martens Hardness

When a urethane resin is prepared by polymerizing the compositions (a), (b), and (c) or the compositions (a') and (c), the Martens hardness of the urethane resin at 150° C. is adjusted by controlling the amount or type of long side chain hydroxyl groups, the amount or type of short side chain hydroxyl groups, the amount or type of unreacted side chains, the amount or type of the (b) silicone, the amount or type of silicone chains in the (a') acrylic resin, or the type of a crosslinking agent. For example, the Martens hardness tends to increase by decreasing the amount of long side chain hydroxyl groups added. In contrast, the Martens hardness tends to decrease by increasing the amount of long side chain hydroxyl groups.

Control of Recovery Rate

When a urethane resin is prepared by polymerizing the compositions (a), (b), and (c) or the compositions (a') and (c), the recovery rate of the urethane resin at 150° C. is adjusted by controlling, for example, the amount of long side chain hydroxyl groups, the amount of short side chain hydroxyl groups, the amount of the (b) silicone, the amount of silicone chains in the (a') acrylic resin, or the amount or type of a crosslinking agent. For example, the recovery rate tends to increase by increasing the crosslinking density of the urethane resin.

Acrylic Resin

As described above, in an exemplary embodiment, an acrylic resin is desirably the (a) acrylic resin in which a ratio [A]/([A]+[B]) is 80% or more or about 80% or more and 100% or less where [A] represents the molar content of hydroxyl groups of side chains having less than 10 carbon atoms (short side chain hydroxyl groups) and [B] represents the molar content of hydroxyl groups of side chains having 10 or more carbon atoms (long side chain hydroxyl groups); and a hydroxyl value is 70 mgKOH/g or more and 400 mgKOH/g or less, or about 70 mgKOH/g or more and about 400 mgKOH/g or less.

Alternatively, the acrylic resin is desirably the (a') at least one acrylic resin selected from the compounds represented by the general formula (2) in which a ratio [A]/([A]+[B]) is 80% or more or about 80% or more and 100% or less where [A] represents the molar content of hydroxyl groups of side chains having less than 10 carbon atoms and [B] represents the molar content of hydroxyl groups of side chains having 10 or more carbon atoms; and a hydroxyl value is 70 mgKOH/g or more and 400 mgKOH/g or less, or about 70 mgKOH/g or more and about 400 mgKOH/g or less.

When the ratio [A]/([A]+[B]) is 80% or more or about 80% or more, a urethane resin having a high heat resistance is provided. The ratio [A]/([A]+[B]) is preferably 90% or more.

When the hydroxyl value is equal to or more than the lower limit, a urethane resin having a high crosslinking density is prepared by polymerization and, as a result, a urethane resin having a high heat resistance is probably provided. When the hydroxyl value is equal to or less than the upper limit, a urethane resin having an appropriate flexibility is probably provided.

The hydroxyl value is preferably 100 mgKOH/g or more and 350 mgKOH/g or less.

The term "hydroxyl value" denotes the number of mg of potassium hydroxide required for acetylating hydroxyl groups in 1 g of a sample. In an exemplary embodiment, the hydroxyl value is measured in accordance with the method defined in JIS K0070-1992 (potentiometric titration). However, when a sample is not dissolved, a solvent such as dioxane or THF is used as a solvent.

Examples of a monomer for forming such an acrylic resin will be listed below. Examples of a monomer having a hydroxyl group include (1) ethylenic monomers having hydroxyl groups such as hydroxymethyl(meth)acrylate, hydroxyethyl(meth)acrylate, hydroxypropyl(meth)acrylate, hydroxybutyl(meth)acrylate, and N-methylolacrylamine. (2) An ethylenic monomer having a carboxy group may be used and examples thereof include (meth)acrylic acid, crotonic acid, itaconic acid, fumaric acid, and maleic acid. As for a monomer having no hydroxyl groups, (3) an ethylenic monomer that is copolymerizable with (1) and (2) may be used with (1) and (2) and examples thereof include (meth)acrylic acid alkyl esters such as methyl(meth)acrylate, ethyl (meth)acrylate, propyl(meth)acrylate, butyl(meth)acrylate, n-propyl (meth)acrylate, n-butyl(meth)acrylate, isobutyl (meth)acrylate, 2-ethylhexyl(meth)acrylate, n-octyl (meth)acrylate, and n-dodecyl(meth)acrylate. When the acrylic resin is made to contain long side chain hydroxyl groups, a monomer prepared by adding 3-5 moles of ε-caprolactone to hydroxymethyl(meth)acrylate is desirably used. The acrylic resin may be a single resin or two or more resins.

The acrylic resin preferably has a bulky group. Specifically, acrylic resins prepared by polymerizing the following monomers having a bulky group are preferred: isobornyl (meth)acrylate, dicyclopentadiene(meth)acrylate, isobornyl oxyethyl(meth)acrylate, dicyclopentenyl (meth)acrylate, and cyclohexyl(meth)acrylate. Of these, isobornyl(meth)acrylate and cyclohexyl(meth)acrylate are particularly preferred.

The acrylic resin preferably does not have long side chain hydroxyl groups or has a ratio [A]/([A] [B]) of 80% or more or about 80% or more.

The acrylic resin may contain a fluorine atom. Examples of an acrylic resin containing a fluorine atom include copolymers prepared by performing the polymerization with an additional monomer such as 2-(perfluorobutyl)ethylacrylate, 2-(perfluorohexyl)ethylacrylate, 2-(perfluorohexyl)ethylmethacrylate, or perfluorohexylethylene.

The content of such fluorine atoms is desirably 5 mass % or more and 50 mass % or less with respect to the entire urethane resin.

Such an acrylic resin according to an exemplary embodiment is synthesized by a method of mixing the above-described monomers and subjecting the mixed monomers to standard radical polymerization, ionic polymerization, or the like and then to purification.

Silicone

In an exemplary embodiment, silicone is desirably (b) at least one silicone selected from the compounds represented by the general formula (1) and/or (a') at least one acrylic resin selected from the compounds having silicone chains as side chains and represented by the general formula (2).

As described above, in the general formulae (1) and (2), represents an amino group, a hydroxyl group, a methoxy group, or an ethoxy group. Of these, a hydroxyl group and a methoxy group are preferred.

$R^2$ represents a methyl group, a phenyl group, or an ethyl group. Of these, a methyl group and a phenyl group are preferred.

The molecular weight of the (b) silicone represented by the general formula (1) or the molecular weight (weight average molecular weight) of silicone (silicone monomer) bonded as a side chain to the (a') acrylic resin represented by the general formula (2) is preferably 250 or more and 50,000 or less and, more preferably 500 or more and 20,000 or less.

Specific examples of the (b) silicone represented by the general formula (1) and silicone (silicone monomer) bonded as a side chain to the (a') acrylic resin represented by the general formula (2) include KF9701, KF8008, KF6001 (these are manufactured by Shin-Etsu Silicones), TSR160, TSR145, TSR165, and YF3804 (these are manufactured by Momentive Performance Materials Inc.).

Isocyanate

The isocyanate functions as a crosslinking agent that crosslinks the acrylic resin and the silicone, the acrylic resins, or the silicones. The isocyanate is not particularly limited. Examples of the isocyanate include methylene diisocyanate, toluene diisocyanate, hexamethylene diisocyanate, and isophorone diisocyanate. A multimer of hexamethylene diisocyanate such as an isocyanurate, a biuret, or an adduct may be used. As for such an isocyanate, a single isocyanate or two or more isocyanates may be used. An isocyanate in which functional groups are blocked such that the isocyanate does not react before a certain temperature is reached may be used.

As for the content (i) of the isocyanate, the ratio of the content (i) of the isocyanate to the amount (ii) of hydroxyl groups of the acrylic resin, that is, the ratio (i)/(ii) is preferably 0.1 or more and 3 or less and, more preferably 0.5 or more and 1 or less.

Polymerization Method

Hereinafter, a method for forming a urethane resin according to an exemplary embodiment (a method for forming a resin by polymerization) will be described.

For example, a method for forming a resin layer sample for evaluation is as follows. When the compositions (a), (b), and (c) are polymerized, the (a) acrylic resin, the (b) silicone, and the (c) isocyanate are mixed together. The resultant mixture is subjected to defoaming under a reduced pressure and then cast onto a polyimide film having a thickness of 90 μm to form a resin layer sample for evaluation. The resin layer sample is heated at 85° C. for 60 minutes and at 160° C. for 0.5 hours to be cured. Practically, the mixture is applied to a surface that is to be protected and then heated in a similar manner to be cured.

However, a method for forming a urethane resin satisfying the Martens hardness and the recovery rate at 150° C. according to an exemplary embodiment is not particularly limited to the method of polymerizing the compositions (a), (b), and (c).

For example, when a blocked isocyanate is used, curing is performed by heating to at least a temperature at which the isocyanate is unblocked. Instead of the defoaming under a reduced pressure, defoaming may be performed by using ultrasound or by leaving the mixture.

A urethane resin according to an exemplary embodiment may be formed by polymerizing the (a') acrylic resin and the (c) isocyanate.

The thus-obtained urethane resin according to an exemplary embodiment is used for a surface protective layer for an endless belt or a roller in an image forming apparatus. In particular, such a urethane resin is suitably used for a fixing belt or a fixing roller of a fixing device, an intermediate transfer belt or an intermediate transfer roller of an intermediate transfer device, a recording medium transport belt, a recording medium transport roller, a frame surface, or the like; especially suitably used for a fixing belt or a fixing roller of a fixing device.

Hereinafter, a member for an image forming apparatus including a urethane resin according to an exemplary embodiment will be described.

Endless Belt

Figure 2:
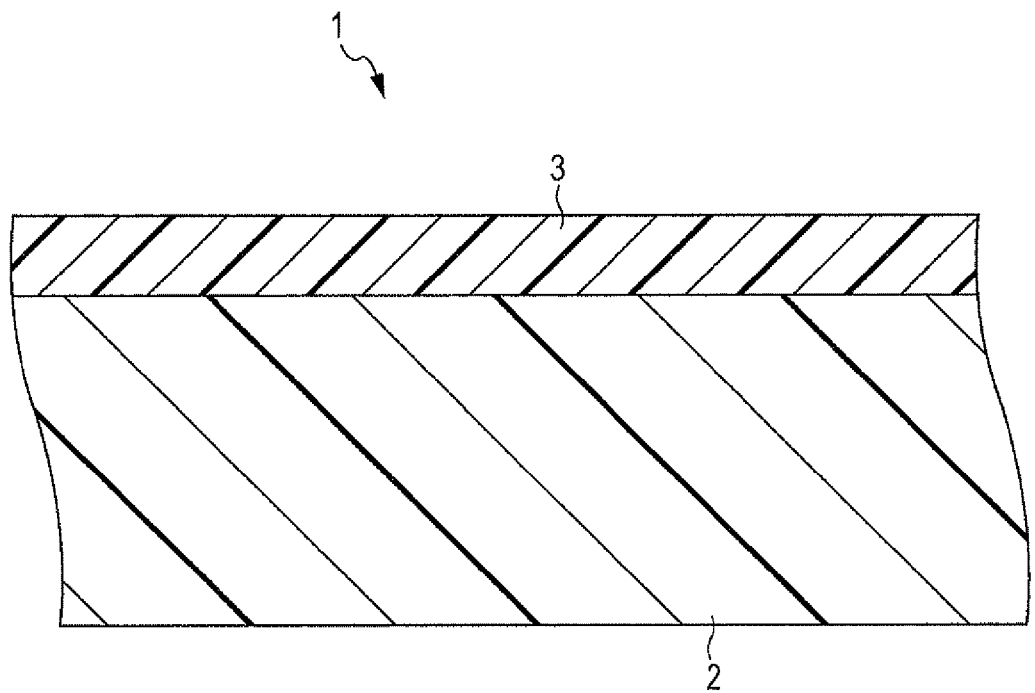
FIG. 2 is a sectional view of an endless belt in an exemplary embodiment.

FIG. 1 is a perspective (partially cutaway) view of an endless belt. FIG. 2 is a sectional view of the endless belt viewed in the direction of arrow II in FIG. 1.

As illustrated in FIGS. 1 and 2, an endless belt 1 is an endless belt including a base member 2 and a surface layer 3 stacked on a surface of the base member 2.

For the surface layer 3, the above-described urethane resin according to an exemplary embodiment is used.

An application of the endless belt 1 is, for example, a fixing belt (that is, a fixing belt in which a urethane resin according to an exemplary embodiment is applied as the surface layer 3 (fixing member)), an intermediate transfer belt, or a recording medium transport belt in an image forming apparatus.

Hereinafter, a case where the endless belt 1 is used as a fixing belt will be described.

A material used for the base member 2 is desirably a heat resistant material. Specifically, such a material may be selected from publicly known various plastic materials and metal materials.

Among plastic materials, those generally referred to as engineering plastics are suitably used. Preferred examples of such engineering plastics include fluorocarbon resins, polyimide (PI), polyamide imide (PAI), polybenzimidazole (PBI), polyether ether ketone (PEEK), polysulfone (PSU), polyether sulfone (PES), polyphenylene sulfide (PPS), polyether imide (PEI), and wholly aromatic polyesters (liquid crystal polymers). Of these, those that are excellent in terms of mechanical strength, heat resistance, wear resistance, chemical resistance, and the like such as thermosetting polyimide, thermoplastic polyimide, polyamide imide, polyether imide, and fluorocarbon resins are preferred.

A metal material used for the base member 2 is not particularly limited. Various metals and alloy materials may be used. For example, SUS, nickel, copper, aluminum, iron, or the like is suitably used. Such a heat resistant resin and such a metal material may be stacked to form a multilayer structure.

Hereinafter, a case where the endless belt 1 is used as an intermediate transfer belt or a recording medium transport belt will be described.

Examples of a material used for the base member 2 may be polyimide resins, polyamide imide resins, polyester resins, polyamide resins, and fluorocarbon resins. Of these, use of a polyimide resin and a polyamide imide resin is preferred. The base member 2 may have a seam or not as long as the base member 2 is annular (endless). The base member 2 may generally have a thickness of 0.02 to 0.2 mm.

When the endless belt 1 is used as an intermediate transfer belt or a recording medium transport belt of an image forming apparatus, the surface resistivity of the endless belt 1 may be controlled within the range of $1 \times 10^9$ to $1 \times 10^{14}$ ohms per square and the volume resistivity of the endless belt 1 may be controlled within the range of $1 \times 10^8$ to $1 \times 10^{13}$ Ωcm. To achieve such conditions, if necessary, a conductive agent may be added to the base member 2 and/or the surface layer 3 as described above. An example of such a conductive agent is carbon black such as Ketjenblack or acetylene black; graphite; a metal or an alloy such as aluminum, nickel, or a copper alloy; a metal oxide such as tin oxide, zinc oxide, potassium titanate, a composite oxide of tin oxide-indium oxide, or a composite oxide of tin oxide-antimony oxide; or a conductive polymer such as polyaniline, polypyrrole, polysulfone, or polyacethylene (here, the term "conductive" of the polymer refers to having a volume resistivity of less than $10^7$ Ωcm). Such a conductive agent may be used alone or in combination of two or more thereof.

The surface resistivity and the volume resistivity are measured with a UR probe of a Hiresta UPMCP-450 manufactured by DIA Instruments Co., Ltd. in an environment at 22° C. and 55% RH in compliance with JIS-K6911.

In the cases of fixing applications, the endless belt 1 may include an elastic layer between the base member 2 and the surface layer 3. Examples of a material of such an elastic layer include various rubber materials. Examples of such various rubber materials include polyurethane rubbers, ethylene propylene rubbers (EPM), silicone rubbers, and fluoro rubbers (FKM). In particular, silicone rubbers, which are excellent in terms of heat resistance and processibility, are preferred. Examples of such silicone rubbers include room temperature vulcanization (RTV) silicone rubbers and high temperature vulcanization (HTV) silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ).

When the endless belt 1 is used as a fixing belt in an electromagnetic induction fixing device, a heating layer may be arranged between the base member 2 and the surface layer 3.

A material used for the heating layer is, for example, a nonmagnetic metal. Specific examples of such a nonmagnetic metal include metal materials such as gold, silver, copper, aluminum, zinc, tin, lead, bismuth, beryllium, antimony, and alloys of the foregoing metals (alloys containing the foregoing metals).

The heating layer preferably has a thickness within the range of 5 to 20 μm, more preferably within the range of 7 to 15 μm, and, in particular, preferably within the range of 8 to 12 μm.

Roller

Hereinafter, a roller will be described. The roller is a tubular roller including a base member and a surface layer coated on a surface of the base member.

For the surface layer, the above-described urethane resin according to an exemplary embodiment is used.

An application of such a tubular roller is, for example, a fixing roller (that is, a fixing roller in which a urethane resin according to an exemplary embodiment is applied as a surface layer (fixing member)), an intermediate transfer roller, or a recording medium transport roller in an image forming apparatus.

Hereinafter, a case where such a tubular roller is used as a fixing roller will be described.

Figure 4:
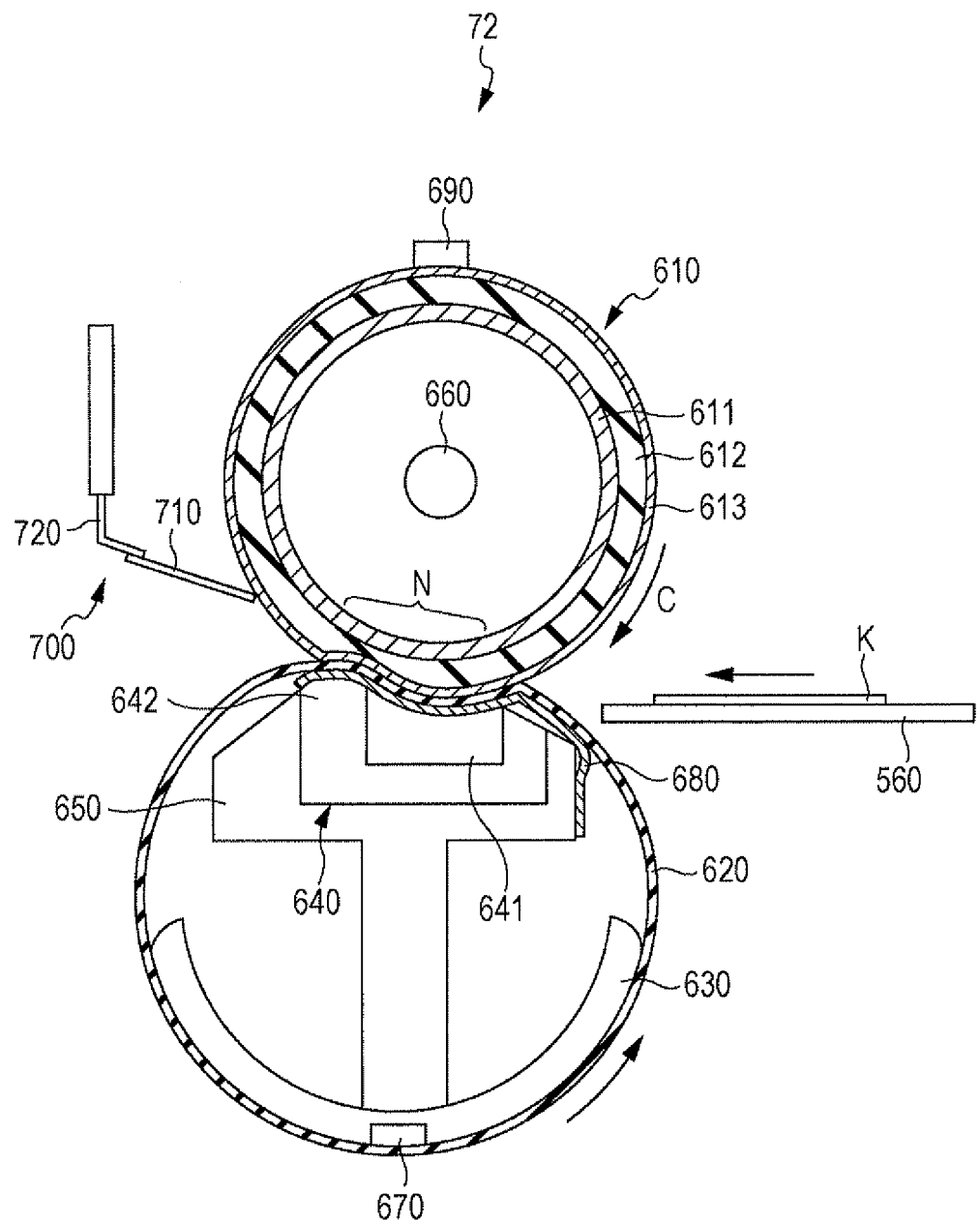
FIG. 4 is a schematic view illustrating the configuration of an image fixing device including an endless belt in an exemplary embodiment.

A fixing roller 610 (fixing member) illustrated in FIG. 4 is not particularly limited in terms of shape, structure, size, or the like. The fixing roller 610 includes a tubular core 611 and a surface layer 613 on the tubular core 611. As illustrated in FIG. 4, an elastic layer 612 may be arranged between the core 611 and the surface layer 613.

A material of the tubular core 611 is, for example, a metal such as aluminum (e.g. A-5052 member), SUS, iron, or copper, an alloy, a ceramic, or a fiber reinforced metal (FRM). The tubular core 611 in a fixing device 72 is constituted by a tubular member having an outer diameter of 25 mm, a wall thickness of 0.5 mm, and a length of 360 mm.

A material of the elastic layer 612 may be selected from publicly known materials and any elastic body having high heat resistance may be used. In particular, an elastic body of, for example, a rubber or an elastomer having a rubber hardness of about 15° to 45° (JIS-A) is preferably used. Examples of such an elastic body include silicone rubbers and fluoro rubbers, In an exemplary embodiment, of these materials, silicone rubbers are preferred in view of small surface tension and excellent elasticity. Examples of such silicone rubbers include RTV silicone rubbers and HTV silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ).

The elastic layer 612 preferably has a thickness of 3 mm or less, more preferably, a thickness within the range of 0.5 to 1.5 mm. In the fixing device 72, a core is covered with a 72 μm-thick layer composed of a HTV silicone rubber having a rubber hardness of 35° (JIS-A).

The surface layer 613 preferably has a thickness of 5 to 50 μm and, more preferably 10 to 30 μm.

As for a heating source for heating the fixing roller 610, as described above, for example, a halogen lamp 660 is used. As long as the heating source has a shape and a structure such that the heating source is installed inside the core 611, the heating source is not particularly limited and is selected in accordance with a purpose. The surface temperature of the fixing roller 610 heated with the halogen lamp 660 is measured with a thermo-sensitive device 690 provided for the fixing roller 610 and the surface temperature is controlled to be constant by a controller. The thermo-sensitive device 690 is not particularly limited and may be a thermistor, temperature sensor, or the like.

Image Forming Apparatus and Image Fixing Device

First Exemplary Embodiment

Figure 3:
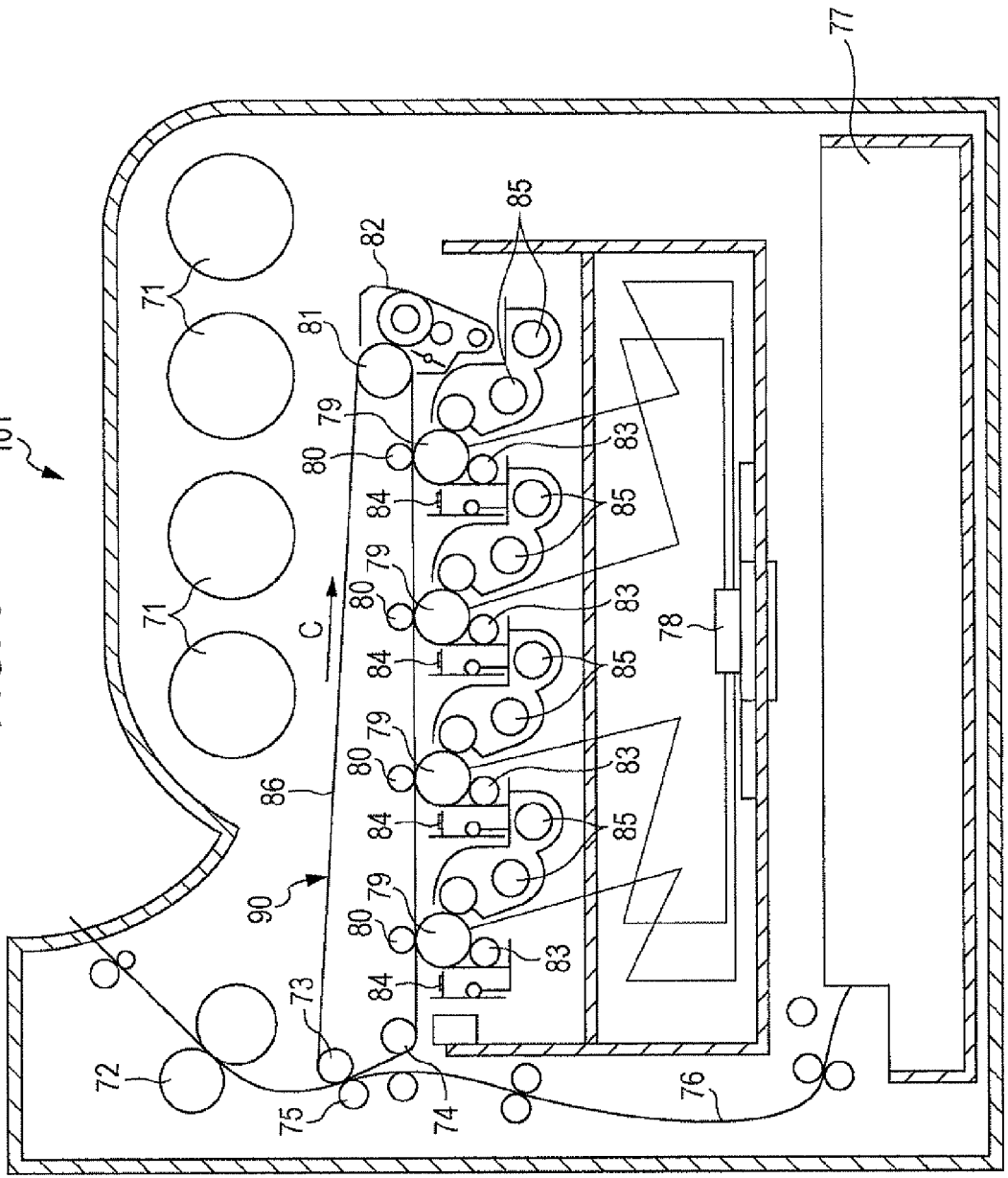
FIG. 3 is a schematic view illustrating the configuration of an image forming apparatus including an endless belt in an exemplary embodiment.

Hereinafter, an image forming apparatus according to a first exemplary embodiment including the endless belt and the roller will be described. FIG. 3 is a schematic view for illustrating a portion of a tandem-system image forming apparatus including the endless belt as a pressure belt of a fixing device, the endless belt as an intermediate transfer belt, and the roller as a fixing roller of the fixing device.

Specifically, an image forming apparatus 101 includes a photoconductor 79 (electrostatic latent image holding body), a charging roller 83 for charging the surface of the photoconductor 79, a laser generating device 78 (electrostatic latent image forming part) for forming an electrostatic latent image by exposing the surface of the photoconductor 79, a developing device 85 (developing part) for developing the latent image formed on the surface of the photoconductor 79 by using a developer to form a toner image, an intermediate transfer belt 86 (intermediate transfer body) onto which the toner image formed by the developing device 85 is transferred from the photoconductor 79, a first transfer roller 80 (first transfer part) for transferring the toner image onto the intermediate transfer belt 86, a photoconductor cleaning member 84 for removing toner, foreign particles, and the like adhering to the photoconductor 79, a second transfer roller 75 (second transfer part) for transferring the toner image on the intermediate transfer belt 86 onto a recording medium, and the fixing device 72 (fixing part) for fixing the toner image on the recording medium. As illustrated in FIG. 3, the first transfer roller 80 may be arranged immediately above the photoconductor 79. Alternatively, the first transfer roller 80 may be arranged at a position displaced with respect to the position immediately above the photoconductor 79.

The configuration of the image forming apparatus 101 illustrated in FIG. 3 will be described further in detail.

In the image forming apparatus 101, the charging roller 83, the developing device 85, the first transfer roller 80 arranged beyond the intermediate transfer belt 86, and the photoconductor cleaning member 84 are arranged counterclockwise around the photoconductor 79. Such members constitute a developing unit corresponding to a single color. A toner cartridge 71 for supplying a developer to the developing device 85 is provided for each developing unit. The laser generating device 78 is arranged for the photoconductor 79 of the developing units. The laser generating device 78 irradiates a surface portion of each photoconductor 79 with laser light in accordance with image information, the surface portion being downstream of the charging roller 83 (in the direction in which the photoconductor 79 is rotated) and upstream of the developing device 85.

Four developing units corresponding to four colors (for example, cyan, magenta, yellow, and black) are horizontally arranged in a line in the image forming apparatus 101. The intermediate transfer belt 86 is arranged so as to be passed through transfer regions between the photoconductors 79 and the first transfer rollers 80 of the four developing units. The intermediate transfer belt 86 is supported so as to be stretched by a support roller 73, a support roller 74, and a driving roller 81 that are sequentially arranged counterclockwise inside the intermediate transfer belt 86. Thus, a belt stretching device 90 is provided. The four first transfer rollers 80 are arranged downstream of the support roller 73 (in the direction in which the intermediate transfer belt 86 is rotated) and upstream of the support roller 74. A transfer cleaning member 82 for cleaning the outer peripheral surface of the intermediate transfer belt 86 is arranged opposite the driving roller 81 through the intermediate transfer belt 86 so as to be in contact with the driving roller 81.

The second transfer roller 75 for transferring a toner image formed on the outer peripheral surface of the intermediate transfer belt 86 onto a surface of a recording paper sheet transported from a paper sheet supplying section 77 through a paper sheet path 76 is arranged opposite the support roller 73 through the intermediate transfer belt 86 so as to be in contact with the support roller 73.

The paper sheet supplying section 77 that contains recording media is provided in a bottom portion of the image forming apparatus 101. A recording medium is supplied from the paper sheet supplying section 77 so as to be passed through the paper sheet path 76 and the nip between the support roller 73 and the second transfer roller 75 that constitute a second transfer unit. The recording medium having been passed through the nip is further transported by a transport part (not shown) so as to be passed through the nip of the fixing device 72. Finally, the recording medium is discharged from the image forming apparatus 101.

Hereinafter, a method for forming an image by using the image forming apparatus 101 illustrated in FIG. 3 will be described. The formation of a toner image is performed in each developing unit. The surface of the photoconductor 79 being rotated counterclockwise is charged with the charging roller 83. Then, a latent image (electrostatic latent image) is formed on the charged surface of the photoconductor 79 by using the laser generating device 78 (exposure device). Then, the latent image is developed with a developer supplied from the developing device 85 to form a toner image. The toner image having been transported to the nip between the first transfer roller 80 and the photoconductor 79 is transferred onto the outer peripheral surface of the intermediate transfer belt 86 being rotated in the direction represented by arrow C. The photoconductor 79 after the transfer of a toner image is subjected to cleaning of toner, foreign particles, and the like adhering to the surface of the photoconductor 79 by using the photoconductor cleaning member 84. Thus, the photoconductor 79 is prepared for the next formation of a toner image.

The toner images developed by the developing units corresponding to colors are sequentially stacked on the outer peripheral surface of the intermediate transfer belt 86 so as to correspond to image information. The thus-superimposed toner images are transported to a second transfer unit and transferred by the second transfer roller 75 onto a surface of a recording paper sheet having been transported from the paper sheet supplying section 77 through the paper sheet path 76. The recording paper sheet onto which the toner images have been transferred is then pressed and heated when the recording paper sheet is passed through the nip of the fixing device 72. As a result, the toner images are fixed to form an image on the surface of the recording medium. Then, the recording medium is discharged from the image forming apparatus.

Fixing Device (Image Fixing Device)

FIG. 4 is a schematic view of the configuration of the fixing device 72 installed in the image forming apparatus 101 according to an exemplary embodiment. The fixing device 72 illustrated in FIG. 4 includes the fixing roller 610 (rotational body) that is driven so as to rotate, an endless belt 620 (pressure belt), and a pressure pad 640 (pressing member) configured to press the fixing roller 610 through the endless belt 620. It will suffice that the pressure pad 640 presses the endless belt 620 and the fixing roller 610 toward each other. Accordingly, the endless belt 620 may be pressed by the fixing roller 610 or the fixing roller 610 may be pressed by the endless belt 620.

The halogen lamp 660, which is an example of a heating part for heating unfixed toner images in a nipping region, is arranged inside the fixing roller 610. The heating part is not limited to a halogen lamp and another heating member generating heat may be used.

The thermo-sensitive device 690 is arranged on the surface of the fixing roller 610 so as to be in contact with the fixing roller 610. Turning on of the halogen lamp 660 is controlled on the basis of temperature values measured with the thermo-sensitive device 690 to maintain the surface temperature of the fixing roller 610 to be a specified temperature (for example, 150° C.)

The endless belt 620 is rotatably supported by the pressure pad 640, a belt running guide 630, and an edge guide (not shown), the pressure pad 640 and the belt running guide 630 being arranged inside the endless belt 620. In a nipping region N, the endless belt 620 is arranged under pressure so as to be in contact with the fixing roller 610.

The pressure pad 640 is arranged inside the endless belt 620 so as to press the fixing roller 610 through the endless belt 620. Thus, the pressure pad 640 and the fixing roller 610 form the nipping region N therebetween. In the pressure pad 640, a pre-nipping member 641 for providing a wide nipping region N is arranged on the entrance side of the nipping region N and a peeling nipping member 642 for distorting the fixing roller 610 is arranged on the exit side of the nipping region. N.

To decrease the sliding resistance between the inner circumferential surface of the endless belt 620 and the pressure pad 640, a low-friction sheet 680 is arranged on the surfaces of the pre-nipping member 641 and the peeling nipping member 642, the surfaces being in contact with the endless belt 620. The pressure pad 640 and the low-friction sheet 680 are held by a metal holder 650.

The holder 650 is equipped with the belt running guide 630 so that the endless belt 620 is rotated smoothly. Specifically, since the inner circumferential surface of the endless belt 620 slides against the belt running guide 630, the belt running guide 630 is composed of a material having a low coefficient of static friction. In addition, the material of the belt running guide 630 has a low thermal conductivity such that the belt running guide 630 is less likely to deprive the endless belt 620 of heat.

The fixing roller 610 is rotated in the direction represented by arrow C by a driving motor (not shown). Such rotation drives the endless belt 620 in a direction opposite to the direction in which the fixing roller 610 is rotated. That is, the fixing roller 610 is rotated clockwise in FIG. 4, whereas the endless belt 620 is rotated counterclockwise.

A paper sheet K including unfixed toner images is guided by a fixing entrance guide 560 and transported to the nipping region N. When the paper sheet K is then passed through the nipping region N, the toner images on the paper sheet K are fixed by pressure applied to the nipping region N and heat supplied by the fixing roller 610.

In the fixing device 72, the pre-nipping member 641 having a recess conforming to the outer circumferential surface of the fixing roller 610 provides the nipping region N.

In the fixing device 72, by disposing the peeling nipping member 642 so as to project toward the outer circumferential surface of the fixing roller 610, the distortion of the fixing roller 610 is locally made large in the exit region of the nipping region N. In such a configuration, after fixing, the paper sheet K is peeled from the fixing roller 610.

A peeling member 700 (peeling auxiliary part) is arranged downstream of the nipping region N, for the fixing roller 610. In the peeling member 700, a peeling baffle 710 is held in a direction (counter direction) intersecting the direction in which the fixing roller 610 is rotated, by a holder 720 so as to be in close proximity to the fixing roller 610.

Hereinafter, members other than the endless belt 620 and the fixing roller 610 in the fixing device 72 will be described in detail.

As described above, the pressure pad 640 arranged inside the endless belt 620 includes the pre-nipping member 641 and the peeling nipping member 642. The pressure pad 640 is supported by the holder 650 such that a spring or an elastic body presses the fixing roller 610 with a load of, for example, 32 kgf. A surface of the pressure pad 640, the surface facing the fixing roller 610, is formed so as to have a recessed curve conforming to the outer circumferential surface of the fixing roller 610. The pre-nipping member 641 and the peeling nipping member 642 may be composed of a material having heat resistance.

The shape and the material of the pressure pad 640 arranged inside the endless belt 620 are not particularly limited as long as the pressure pad 640 functions to press the fixing roller 610 through the endless belt 620 and to form the nipping region N through which a paper sheet K including an unfixed toner image is passed between the endless belt 620 and the fixing roller 610. In addition to the pressure pad 640, for example, a pressure roller configured to press the fixing roller 610 while being rotated may also be arranged.

As for the pre-nipping member 641, a heat resistant elastomer such as a silicone rubber or a fluoro rubber or an elastic body such as a leaf spring is used. Of such materials, a silicone rubber is preferred in view of excellent elasticity. Examples of such a silicone rubber include RTV silicone rubbers and HTV silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ). A silicone rubber having a JIS-A hardness of 10° to 40° is preferably used in view of hardness. The shape, structure, size, and the like of such an elastic body are not particularly limited and are selected in accordance with a purpose. In the fixing device 72, a silicone rubber member having a width of 10 mm, a thickness of 5 mm, and a length of 320 mm is used.

The peeling nipping member 642 is composed of a heat resistant resin such as PPS (polyphenylene sulfide), polyimide, polyester, or polyamide; or a metal such as iron, aluminum, or SUS. As for the shape of the peeling nipping member 642, the peeling nipping member 642 is formed so as to have an outer shape in the nipping region N, the outer shape being a convex curved surface having a certain radius of curvature. In the fixing device 72 according to an exemplary embodiment, the endless belt 620 is wrapped around the fixing roller 610 at a wrapping angle of 40° by using the pressure pad to form the nipping region N having a width of 8 mm.

The low-friction sheet 680 is arranged in order to decrease the sliding resistance (frictional resistance) between the inner circumferential surface of the endless belt 620 and the pressure pad 640. For the low-friction sheet 680, a material having a low coefficient of friction and being excellent in terms of wear resistance and heat resistance is suitably used.

Examples of a material for the low-friction sheet 680 include various materials such as metals, ceramics, and resins. Specific examples of such materials include heat resistant resins such as fluorocarbon resins, polyether sulfone (PES), polybutylene terephthalate (PBT), liquid crystal polymers (LCP), polyphenylene sulfide (PPS), and polyethylene terephthalate (PET); natural materials of 6-nylon and natural materials of 6,6-nylon; and materials in which carbon, glass fiber, or the like is added to the foregoing materials.

In particular, a fluorocarbon resin sheet in which a surface being in contact with the endless belt 620 has a low sliding resistance against the inner circumferential surface of the endless belt 620 and a surface on which lubricant is held has micro-irregularities is preferred.

Specifically, for example, a PTFE resin sheet formed by sintering, a glass fiber sheet impregnated with Teflon (registered trademark), a laminate sheet in which a skived film sheet composed of a fluorocarbon resin is sandwiched by heat sealing between glass fiber sheets, or a fluorocarbon resin sheet in which streak-shaped irregularities are formed is used.

The low-friction sheet 680 may be formed as an independent member separate from the pre-nipping member 641 and the peeling nipping member 642. Alternatively, the low-friction sheet 680 may be integrally formed together with the pre-nipping member 641 and the peeling nipping member 642.

A lubricant applying member 670 is also arranged in the holder 650 so as to extend in the longitudinal direction of the fixing device 72. The lubricant applying member 670 is arranged so as to be in contact with the inner circumferential surface of the endless belt 620 and supplies an appropriate amount of a lubricant to the endless belt 620. Thus, the lubricant is supplied to the portion where the endless belt 620 slides against the low-friction sheet 680 and the sliding resistance between the endless belt 620 and the pressure pad 640 through the low-friction sheet 680 is further decreased. In this way, smooth rotation of the endless belt 620 is achieved. The lubricant applying member 670 also provides an effect of suppressing wear of the inner circumferential surface of the endless belt 620 and the surface of the low-friction sheet 680.

Such a lubricant may be a silicone oil. An example of such a silicone oil is a dimethyl silicone oil, an organometallic-salt-added dimethyl silicone oil, a hindered-amine-added dimethyl silicone oil, an organometallic-salt-and-hindered-amine-added dimethyl silicone oil, a methylphenyl silicone oil, an amino-modified silicone oil, an organometallic-salt-added amino-modified silicone oil, a hindered-amine-added amino-modified silicone oil, a carboxy-modified silicone oil, a silanol-modified silicone oil, a sulfonic-acid-modified silicone oil, or the like. Of these, an amino-modified silicone oil, which has excellent wettability, is preferably used.

In the fixing device 72, the lubricant applying member 670 is used to supply a lubricant to the inner circumferential surface of the endless belt 620. Alternatively, a configuration in which a lubricant applying member and a lubricant are not used may be employed.

A methylphenyl silicone oil, a fluorocarbon oil (a perfluoropolyether oil or a modified perfluoropolyether oil), or the like is suitably used. An anti-oxidizing agent may be added to a silicone oil. A synthetic lubricant oil grease in which a solid substance and a liquid are mixed together such as a silicone grease, a fluorocarbon grease, or a combination of such greases may be used. In the fixing device 72, an amino-modified silicone oil having a viscosity of 300 cs (KF96 manufactured by Shin-Etsu Chemical Co., Ltd.) is used.

As described above, the inner circumferential surface of the endless belt 620 slides against the belt running guide 630. Thus, the belt running guide 630 may be composed of a material having a low coefficient of friction and a low thermal conductivity such that the belt running guide 630 is less likely to deprive the endless belt 620 of heat. Accordingly, a heat resistant resin such as PFA or PPS is used.

In the image forming apparatus 101 according to an exemplary embodiment, the endless belt is used as the endless belt 620 of the fixing device 72. However, the endless belt may be used as the intermediate transfer belt 86.

Second Exemplary Embodiment

An image forming apparatus according to a second exemplary embodiment has a configuration in which, instead of the fixing device 72 arranged in the image forming apparatus 101 according to the first exemplary embodiment, a fixing device including a fixing belt including a heating source (the above-described endless belt) and a pressure roller (the above-described roller) is used. Since the second exemplary embodiment is the same as the first exemplary embodiment except that the different fixing device is used, descriptions of the common features are omitted.

Fixing Device (Image Fixing Device)

Figure 5:
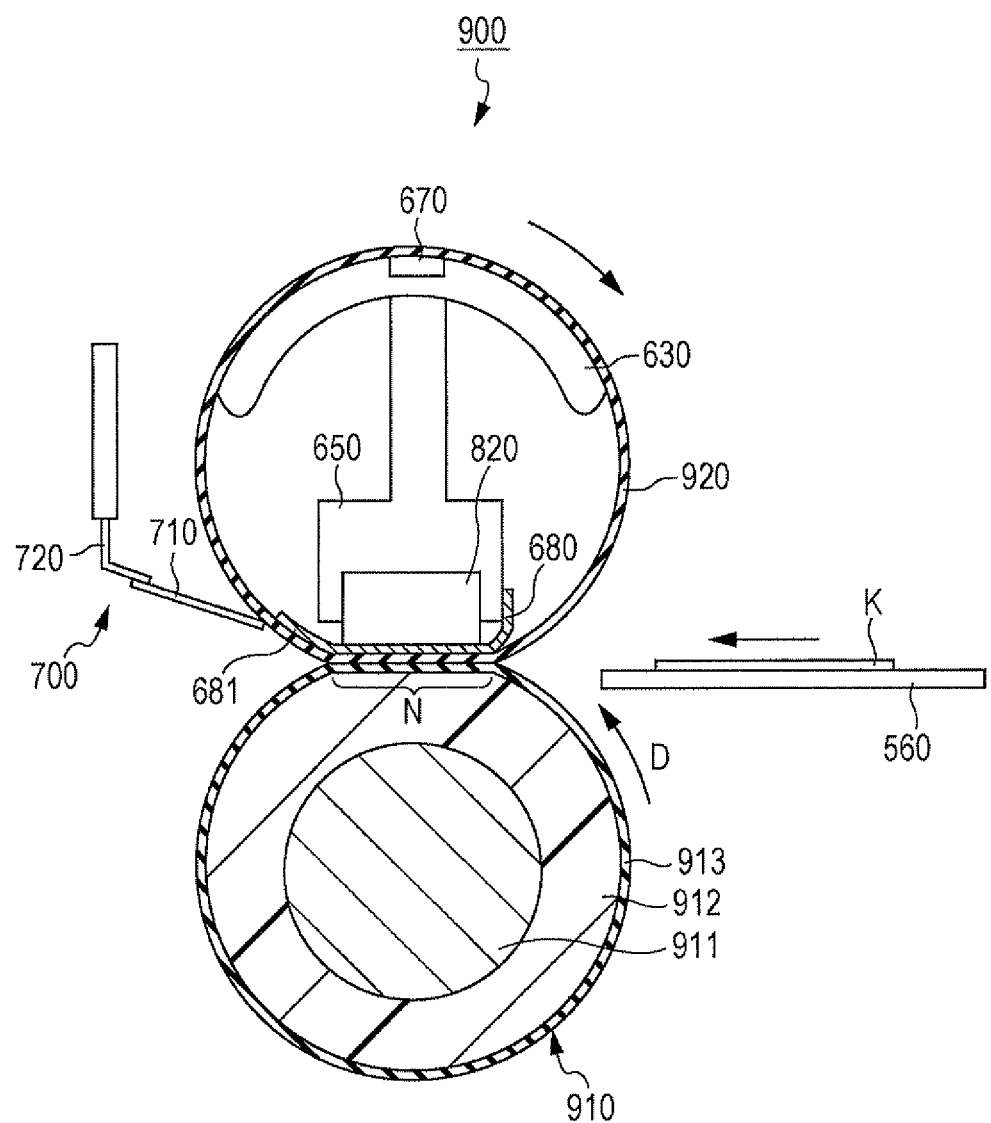
FIG. 5 is a schematic view illustrating the configuration of another image fixing device including an endless belt in an exemplary embodiment.

FIG. 5 is a schematic view of the configuration of a fixing device. Specifically, FIG. 5 illustrates a fixing device including the above-described endless belt as a fixing belt and the above-described roller as a pressure roller. Components similar to those in the image forming apparatus according to the first exemplary embodiment are denoted with the same reference numerals and detailed descriptions of such components are omitted.

As illustrated in FIG. 5, a fixing device 900 according to the second exemplary embodiment includes a fixing belt 920, which is an endless belt, and a pressure roller 910, which is an example of a rotational body driven so as to rotate. The fixing belt 920 has the same configuration as the above-described endless belt 620.

The fixing belt 920 is arranged so as to face a surface of the paper sheet K, the surface holding a toner image. A ceramic heater 820 that is a heating resistor, which is an example of a heating part, is arranged inside the fixing belt 920. The ceramic heater 820 is configured to supply heat to the nipping region N.

As for the ceramic heater 820, a surface facing the pressure roller 910 is formed so as to be flat. The ceramic heater 820 is arranged so as to press the pressure roller 910 through the fixing belt 920 to form the nipping region N. Thus, the ceramic heater 820 also functions as a pressing member. The paper sheet K having been passed through the nipping region N is peeled from the fixing belt 920 in the exit region (peeling nipping region) of the nipping region N due to change in the curvature of the fixing belt 920.

To decrease the sliding resistance between the inner circumferential surface of the fixing belt 920 and the ceramic heater 820, a low-friction sheet 680 is arranged between the inner circumferential surface of the fixing belt 920 and the ceramic heater 820. The low-friction sheet 680 may be formed as an independent member separate from the ceramic heater 820. Alternatively, the low-friction sheet 680 may be integrally formed together with the ceramic heater 820.

The pressure roller 910 is arranged so as to face the fixing belt 920. The pressure roller 910 is rotated in the direction represented by arrow D by a driving motor (not shown). Such rotation causes the fixing belt 920 to rotate. The pressure roller 910 includes a stack of a core (cylindrical metal member) 911, a heat-resistant elastic layer 912 coating the outer circumferential surface of the core 911, and a release layer 913 that is a heat-resistant resin coating or a heat-resistant rubber coating. If necessary, each layer is made semiconductive by addition of carbon black or the like thereto to address offsetting of toner.

The peeling member 700 (peeling auxiliary part) may be arranged downstream of the nipping region N, for the fixing belt 920. In the peeling member 700, the peeling baffle 710 is held in a direction (counter direction) intersecting the direction in which the fixing belt 920 is rotated, by the holder 720 so as to be in close proximity to the fixing belt 920.

The paper sheet K including unfixed toner images is guided by the fixing entrance guide 560 and transported to the nipping region N of the fixing device 900. When the paper sheet K is passed through the nipping region N, the toner images on the paper sheet K are fixed by pressure applied to the nipping region N and heat supplied by the ceramic heater 820 arranged on the fixing belt 920 side of the fixing device 900.

Here, in the fixing device 900 in an exemplary embodiment, the pressure roller 910 is formed so as to have a reverse crown shape (flaring shape) in which the outer diameters of the two end portions are larger than the outer diameter of the central portion. The fixing belt 920 has an irregularly shaped structure in the inner surface. This irregularly shaped structure is configured to deform in the nipping region so as to expand in conformity to the surface shape of the pressure roller 910. In such a configuration, when a paper sheet is passed through the nipping region, a tensile force is applied by the pressure roller 910 in the width direction from the central portion to the two end portions of the paper sheet. Thus, the paper sheet is stretched and the length of the fixing belt 920 in the surface width direction is increased.

Accordingly, in the fixing device 900 in an exemplary embodiment, slipping of the fixing belt 920 against the paper sheet K is suppressed in the entire region from the central portion to the two end portions of the fixing belt 920.

As for the heating source, other than the ceramic heater 820, a halogen lamp arranged inside the fixing belt 920 or an electromagnetic induction coil that is arranged inside or outside of the fixing belt 920 and generates heat by electromagnetic induction may be used.

In addition to the flat pressure member, for example, a pressure roller configured to press the pressure roller 910 while being rotated may also be arranged inside the fixing belt 920.

Third Exemplary Embodiment

Hereinafter, an image forming apparatus according to a third exemplary embodiment including the above-described endless belt as a paper-sheet transport belt will be described.

Figure 6:
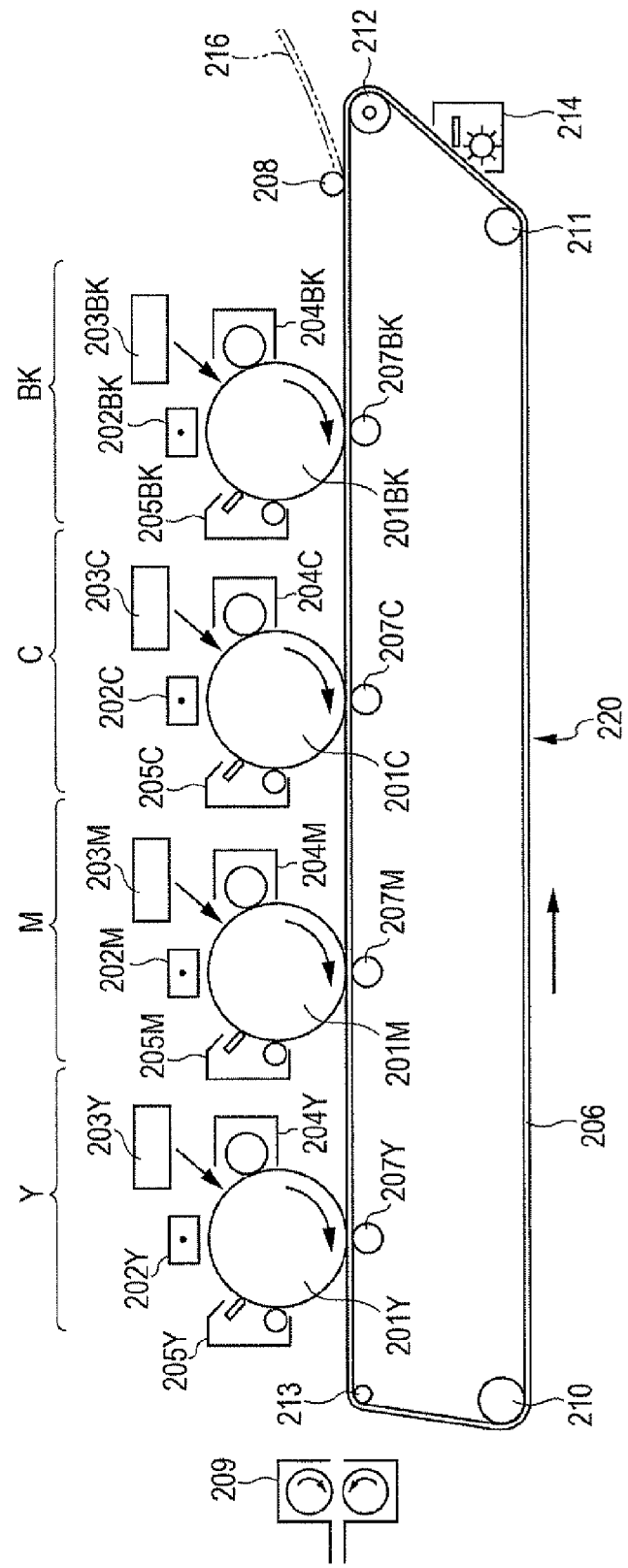
FIG. 6 is a schematic view illustrating the configuration of an image forming apparatus in which an endless belt in an exemplary embodiment is used as a paper-sheet transport belt.

FIG. 6 is a schematic view illustrating an image forming apparatus according to the third exemplary embodiment. In the image forming apparatus illustrated in FIG. 6, units Y, M, C, and BK respectively include photoconductor drums 201Y, 201M, 201C, and 201BK that are configured to rotate in the clockwise directions indicated by arrows. In the proximity of the photoconductor drums 201Y, 201M, 201C, and 201BK, charging devices 202Y, 202M, 202C, and 202BK, exposing devices 203Y, 203M, 203C, and 203BK, developing devices corresponding to colors (yellow developing device 204Y, magenta developing device 204M, cyan developing device 204C, and black developing device 204BK), and photoconductor-drum cleaning members 205Y, 205M, 205C, and 205BK are respectively arranged.

The units Y, M, C, and BK are arranged in parallel with a paper-sheet transport belt 206 in the sequence of the units BK, C, M, and Y. However, an appropriate sequence of, for example, the units BK, Y, C, and M, may be set in accordance with an image forming method.

The paper-sheet transport belt 206 is supported so as to be stretched by belt support rollers 210, 211, 212, and 213 arranged inside the paper-sheet transport belt 206. Thus, a belt stretching device 220 for the image forming apparatus is provided. The paper-sheet transport belt 206 is configured to be rotated in a counterclockwise direction indicated by arrow at the same peripheral velocity as that of the photoconductor drums 201Y, 201M, 201C, and 201BK. The paper-sheet transport belt 206 is arranged such that a portion of the paper-sheet transport belt 206, the portion being between the belt support rollers 212 and 213, is in contact with the photoconductor drums 201Y, 201M, 201C, and 201BK. A belt cleaning member 214 is provided for the paper-sheet transport belt 206.

Transfer rollers 207Y, 207M, 207C, and 2078K are respectively arranged inside the paper-sheet transport belt 206 and at positions so as to face positions where the paper-sheet transport belt 206 and the photoconductor drums 201Y, 201M, 201C, and 201BK are in contact with each other. Thus, the transfer rollers 207Y, 207M, 207C, and 207BK, the photoconductor drums 201Y, 201M, 201C, and 201BK, and the paper-sheet transport belt 206 form transfer regions where toner images are transferred onto a paper sheet (receiver) 216. As illustrated in FIG. 6, the transfer rollers 207Y, 207M, 207C, and 207BK may be respectively arranged immediately below the photoconductor drums 201Y, 201M, 201C, and 201BK. Alternatively, the transfer rollers 207Y, 207M, 207C, and 207BK may be respectively arranged at positions displaced with respect to the positions immediately below the photoconductor drums 201Y, 201M, 201C, and 201BK.

A fixing device 209 is arranged such that the paper sheet is transported to the fixing device 209 after the paper sheet is passed through the transfer regions formed between the paper-sheet transport belt 206 and the photoconductor drums 201Y, 201M, 201C, and 201BK.

The paper sheet 216 is transported to the paper-sheet transport belt 206 by a paper-sheet transport roller 208.

In the image forming apparatus according to the third exemplary embodiment illustrated in FIG. 6, in the unit BK, the photoconductor drum 2013K is driven so as to be rotated. Such rotation operatively drives the charging device 202BK and the charging device 2028K charges the surface of the photoconductor drum 201BK such that the surface has an intended polarity and potential. The photoconductor drum 201BK whose surface is thus charged is then subjected to image exposure by using the exposing device 203BK. Thus, an electrostatic latent image is formed on the surface of the photoconductor drum 201BK.

Then, the electrostatic latent image is developed with the black developing device 204BK. Thus, a toner image is formed on the surface of the photoconductor drum 201BK. A developer used at this time may be a single component developer or a two component developer.

The thus-formed toner image is passed through the transfer region formed between the photoconductor drum 201BK and the paper-sheet transport belt 206. The paper sheet 216 is electrostatically attracted to the paper-sheet transport belt 206 and transported to the transfer region. The toner image is sequentially transferred onto a surface of the paper sheet 216 by an electric field formed by a transfer bias applied from the transfer roller 207BK.

After that, toner remaining on the photoconductor drum 201BK is cleaned and removed by the photoconductor-drum cleaning member 205BK. Thus, the photoconductor drum 201BK is prepared for the next image transfer.

The above-described image transfer is also performed in the units C, M, and Y in the above-described manner.

The paper sheet 216 onto which toner images have been transferred by the transfer rollers 207BK, 207C, 207M, and 207Y is then transported to the fixing device 209 and the toner images are fixed on the paper sheet 216.

As a result, an intended image is formed on the paper sheet.

EXAMPLES

Hereinafter, exemplary embodiments according to the present invention will be described in detail with reference to examples. However, the present invention is not limited to the examples described below. In the following description, "parts" and "%" are based on mass unless otherwise specified.

Sample Preparation Method

Example 1

Synthesis of Acrylic Resin Prepolymer

A monomer solution is prepared by mixing hydroxyethyl methacrylate (HEMA, the number of carbon atoms in a side chain containing a hydroxyl group: 3) that is a monomer providing short side chain hydroxyl groups and butyl methacrylate (BMA) with a molar ratio of HEMA to BMA of 1:1, and mixing the resultant mixture with 5% (with respect to the monomers, that is, percentage with respect to the HEMA and BMA) of a polymerization initiator (benzoyl peroxide, BPO) and 10% (with respect to the monomers) of butyl acetate. The monomer solution is charged into a dropping funnel and dropped into 100% (with respect to the monomers) of butyl acetate that is heated to 110° C. and being stirred over three hours under nitrogen flow to polymerize the monomers. Furthermore, a solution composed of 30% (with respect to the monomers) of butyl acetate and 0.5% (with respect to the monomers) of BPO is dropped to this reaction solution over aft hour to complete the reaction. The reaction solution is always maintained at 110° C. and being stirred during the reaction. As a result, an acrylic resin prepolymer A1 not containing long side chain hydroxyl groups is synthesized.

Formation of Resin Layer Sample

The following solutions A and B are mixed together in the following proportions and the following solution C is then further added thereto. The resultant mixture is defoamed for 10 minutes under a reduced pressure. The thus-prepared solution is cast onto a polyimide film having a thickness of 90 and cured at 85° C. for an hour and then at 130° C. for 30 minutes. Thus, a resin layer sample A1 having a thickness of 40 m is obtained.

Solution A (solution of the above-described acrylic resin prepolymer A1, 44.2%, hydroxyl value: 206): 11.31 parts Solution B (silicone represented by the general formula (1) where $R^1$ represents a hydroxyl group and $R^2$ represents a phenyl group or a methyl group, manufactured by Momentive Performance Materials Inc., trade name: TSR160, hydroxyl value: 148): 2.08 parts Solution C (isocyanate, manufactured by Asahi Kasei Chemicals Corporation, Duranate TKA100, compound name: hexamethylene diisocyanate-based polyisocyanurate): 2.49 parts The mass percentage of the monomer having a silicone chain (Si—O) with respect to the entire monomers used in the polymerization is 14.3%.

Examples 2 to 7 and Comparative Examples 1 to 3

Resin layer samples are formed by the same method as in Example 1 except that the monomers (HEMA and BMA) used in "Synthesis of acrylic resin prepolymer" in Example 1 are changed to compositions summarized in Table 1 below and the silicone and the curing agent (isocyanate) that are used in "Formation of resin layer sample" are changed to compositions summarized in Table 2 below.

Comparative Example 4

A resin layer sample composed of a tetrafluoroethylene perfluoro (alkyl vinyl ether) copolymer (PFA) is formed.

TABLE 1

| | | Composition of acrylic resin | | | | | |
|---|---|---|---|---|---|---|---|
| | | HEMA (short side chain) | PLACCEL FM3 (long side chain) | BMA (no functional groups) | Isobornyl methacrylate (bulky side chain) | CHEMINOX FAMAC-6 (fluorine atoms) | SILAPLANE FM0711 (silicone side chain) |
| Examples | 1 | 1 | | | 1 | | |
| | 2 | 1 | | | 1 | | |
| | 3 | 4 | 1 | | | | |
| | 4 | 11 | | | | 1 | |
| | 5 | 1 | | | | 1 | |
| | 6 | 5 | | | | 1 | 1 (silicone content: 10%) |
| | 7 | 1 | | | 1 | | |
| Comparative examples | 1 | 1 | | | 1 | | |
| | 2 | 1 | | 2 | 3 | | |
| | 3 | | | 1 | 5 | | |

(molar ratio)

TABLE 2

| | | Composition (other than prepolymer) of resin layer sample | | | |
|---|---|---|---|---|---|
| | | Silicone TSR160 Mass percentage with respect to acrylic resin | Silicone YR3204 | Curing agent isocyanate TKA100 Ratio with respect to amount of hydroxyl groups of acrylic resin | Curing agent isocyanate TPAB80E |
| Examples | 1 | 20% | | 0.7 | |
| | 2 | | | | 1 |
| | 3 | 20% | | 0.7 | |
| | 4 | 20% | | | 1 |
| | 5 | | 10% | | 1 |
| | 6 | 10% | | | 1 |
| | 7 | | 10% | 1 | |
| Comparative examples | 1 | 50% | | 0.05 | |
| | 2 | | | | 1 |
| | 3 | | | 1 | |

The compositions in Tables 1 and 2 are as follows.

HEMA: hydroxyethyl methacrylate (having a short side chain)

PLACCEL FM3 (having a long side chain) manufactured by DAICEL CHEMICAL INDUSTRIES, LTD.

BMA: butyl methacrylate (having no functional groups)

Isobornyl methacrylate (having a bulky side chain)

CHEMINOX FAMAC-6 (having fluorine atoms) manufactured by UNIMATEC CO., LTD.

SILAPLANE FM0711 (having silicone chains as side chains) manufactured by Chisso Corporation Silicone: TSR160 manufactured by Momentive Performance Materials Inc.

Silicone: YR3204 manufactured by Momentive Performance Materials Inc.

Curing agent (isocyanate): TKA100 manufactured by Asahi Kasei Chemicals Corporation Curing agent (isocyanate): TPAB80E manufactured by Asahi Kasei Chemicals Corporation Evaluation Measurement of Martens Hardness and Recovery Rate at 150° C.

Examples and Comparative examples are measured in terms of Martens hardness at 150° C. and recovery rate at 150° C. by the following method. The results are summarized in Table 3 below.

A FISCHERSCOPE HM2000 (manufactured by Fischer Instruments K.K.) is used as a measurement apparatus. Each urethane resin layer sample formed by applying a urethane resin to a polyimide film is fixed on a slide glass by using an adhesive agent and placed on a hot stage of the measurement apparatus. The urethane resin layer sample is subjected to an increasing load up to 0.5 mN over 15 seconds while being kept at 150° C. and the urethane resin layer sample is held under the load of 0.5 mN for 5 seconds. At this time, the maximum displacement of the urethane resin layer sample is defined as h1. After that, the load is decreased to 0.005 mN over 15 seconds and the urethane resin layer sample is held under the load of 0.005 mN for a minute. At this time, the displacement of the urethane resin layer sample is defined as h2. The recovery rate [(h1−h2)/h1] is then calculated. In addition, the Martens hardness is determined from a load displacement curve obtained at this time.

Heat Resistance Test at 150° C.

The resin layer samples obtained above are evaluated in terms of heat resistance by the following method.

Each urethane resin layer sample formed on a polyimide film by the application and polymerization is placed on a hot plate (at 150° C.). The urethane resin layer sample is scratched with pointed tweezers and observed whether the scratch is removed within a minute or not (heat-resistance scratching test).

Each urethane resin layer sample formed on a polyimide film by the application and polymerization is left to stand in a furnace at 170° C. for 24 hours and then the sample is measured in terms of recovery rate at 150° C. (long-duration heat-resistance scratching test). The results are summarized in Table 3 below.

The evaluation is performed in accordance with the following criteria.

Excellent: The scratch disappears within 1 second.
In the long-duration heat-resistance scratching test, no decrease in the recovery rate at 150° C. is observed before and after the standing.

Good: The scratch disappears within 1 minute.
In the long-duration heat-resistance scratching test, a decrease in the recovery rate at 150° C. is less than 10% before and after the standing.

Fair: The scratch disappears at a higher temperature.
In the long-duration heat-resistance scratching test, a decrease in the recovery rate at 150° C. is 10% or more and less than 20% before and after the standing.

Poor: The scratch does not disappear.

In the long-duration heat-resistance scratching test, a decrease in the recovery rate at 150° C. is 20% or more before and after the standing.

Scratching Resistance Test with Actual Apparatus

The resin layer samples obtained above are evaluated with an actual apparatus in terms of resistance to scratching by the following method.

Each of the polyimide films on which the resin layer samples are formed, the polyimide films being obtained above, is affixed to the surface of a fixing roller and 10,000 paper sheets are passed through the fixing device in which the fixing temperature (surface temperature of the fixing roller) is set at 150° C. After these paper sheets are passed, the presence or absence of paper edge scratches in the resin layer sample is visually inspected. The fixing device used is a DocuCentre 02101 (trade name, manufactured by Fuji Xerox Co., Ltd.). The results are summarized in Table 3 below.

The evaluation is performed in accordance with the following criteria.

Good: Absence of scratches
Fair: Presence of shallow scratches having a depth of 0.5 μm or less
Poor: Presence of scratches having a depth of more than 0.5 μm Releasability Test The resin layer samples obtained above are evaluated in terms of releasability by the following method.

Each of the polyimide films on which the resin layer samples are formed, the polyimide films being obtained above, is affixed to the surface of a fixing roller and 1,000 paper sheets are passed through the fixing device (the same fixing device as that used above but a peeling claw is removed). In such a configuration where the peeling claw is not used, the samples in which 1,000 paper sheets are passed are evaluated as "Good" and the samples in which 1,000 paper sheets are not passed are evaluated as "Poor".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A urethane resin that is formed by polymerizing
(a) an acrylic resin in which a ratio [A]/([A]+[B]) is from 80% to 100%, where [A] represents a molar content of hydroxyl groups of side chains having less than 10 carbon atoms and [B] represents a molar content of hydroxyl groups of side chains having 10 or more carbon atoms; and a hydroxyl value is from about 70 mg KOH/g to about 400 mg KOH/g;
(b) at least one silicone selected from compounds represented by a general formula (1) below

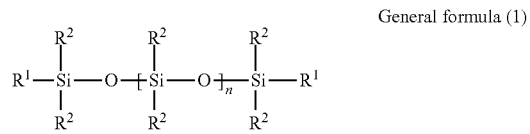

General formula (1)

where $R^1$ represents an amino group, a hydroxyl group, a methoxy group, or an ethoxy group; $R^2$ represents a methyl group, a phenyl group, or an ethyl group; and n is from 3 to 1,000; and
(c) an isocyanate,
wherein the urethane resin has a Martens hardness of from 1 N/mm² to 200 N/mm² at 150° C. and a recovery rate of from 80% to 100% at 150° C.

2. The urethane resin according to claim 1, wherein a mass percentage of a monomer having a silicone chain (Si—O) with respect to entire monomers used for the polymerization is from about 1 mass % to about 50 mass %.

3. The urethane resin according to claim 2, further comprising a fluorine atom.

4. The urethane resin according to claim 3, wherein the (a) acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth)acrylate, and cyclohexyl (meth)acrylate.

TABLE 3

| | | Martens hardness at 150° C. [N/mm²] | Recovery rate at 150° C. [%] | Acrylic resin [A]/([A] + [B]) [%] | Acrylic resin Hydroxyl value [mgKOH/g] | Mass percentage of silicone* [mass %] | Evaluation Heat-resistance scratching test | Evaluation Long-duration heat-resistance scratching test | Evaluation Scratching resistance with actual apparatus | Releasability |
|---|---|---|---|---|---|---|---|---|---|---|
| Unit | | | | | | | — | — | — | — |
| Examples | 1 | 7.8 | 86 | 100 | 206 | 14.3 | Excellent | Excellent | Good | Good |
| | 2 | 38 | 97 | 100 | 206 | 0 | Excellent | Good | Poor | Poor |
| | 3 | 5 | 99 | 80 | 179 | 10 | Good | Fair | Good | Poor |
| | 4 | 150 | 91 | 100 | 331 | 10 | Excellent | Excellent | Good | Good |
| | 5 | 2.3 | 83 | 100 | 100 | 10 | Excellent | Excellent | Good | Good |
| | 6 | 58 | 95 | 100 | 216 | 20 | Excellent | Excellent | Good | Good |
| | 7 | 163 | 81 | 100 | 159 | 10 | Good | Good | Fair | Poor |
| Comparative examples | 1 | 223 | 56 | 100 | 159 | 50 | Poor | Poor | Poor | Good |
| | 2 | 0.9 | 100 | 33 | 112 | 0 | Poor | Poor | Poor | Poor |
| | 3 | 0.2 | 100 | 0 | 47 | 0 | Poor | Poor | Poor | Poor |
| | 4 | 13 | 77 | — | — | 0 | Poor | Poor | Poor | Good |

*"Mass percentage of silicone" indicates the mass percentage of monomers having a silicone chain with respect to the entire monomers used for polymerization.

5. The urethane resin according to claim 2, wherein the (a) acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth)acrylate, and cyclohexyl (meth)acrylate.

6. The urethane resin according to claim 1, further comprising a fluorine atom.

7. The urethane resin according to claim 6, wherein the (a) acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth)acrylate, and cyclohexyl (meth)acrylate.

8. The urethane resin according to claim 1, wherein the (a) acrylic resin is prepared by polymerizing, as monomers, at least one selected from the croup consisting of isobornyl (meth)acrylate, dicyclopentadiene (meth)acrylate, isobornyl oxyethyl (meth)acrylate, dicyclopentenyl (meth)acrylate, and cyclohexyl (meth)acrylate.

9. A urethane resin that is formed by polymerizing
(a') at least one acrylic resin selected from compounds represented by a general formula (2) below in which a ratio [A]/([A]+[B]) is from 80% to 100%, where [A] represents a molar content of hydroxyl groups of side chains having less than 10 carbon atoms and [B] represents a molar content of hydroxyl groups of side chains having 10 or more carbon atoms; and a hydroxyl value is from about 70 mg KOH/g to about 400 mg KOH/g, General formula (2)

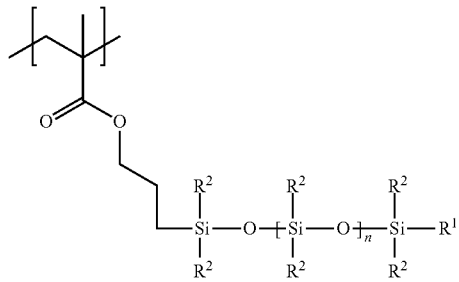

where $R^1$ represents an amino group, a hydroxyl group, a methoxy group, or an ethoxy group; $R^2$ represents a methyl group, a phenyl group, or an ethyl group; and n is from 3 to 1,000; and
(b) an isocyanate,
wherein the urethane resin has a Martens hardness of from 1 N/mm$^2$ to 200 N/mm$^2$ at 150° C. and a recovery rate of from 80% to 100% at 150° C.

10. The urethane resin according to claim 9, wherein a mass percentage of a monomer having a silicone chain (Si—O) with respect to entire monomers used for the polymerization is from about 1 mass % to about 50 mass %.

11. The urethane resin according to claim 10, further comprising a fluorine atom.

12. The urethane resin according to claim 11, wherein the (a') at least one acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth) acrylate, and cyclohexyl (meth)acrylate.

13. The urethane resin according to claim 10, wherein the (a') at least one acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth) acrylate, and cyclohexyl (meth)acrylate.

14. The urethane resin according to claim 9, further comprising a fluorine atom.

15. The urethane resin according to claim 14, wherein the (a') at least one acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth) acrylate, and cyclohexyl (meth)acrylate.

16. The urethane resin according to claim 9, wherein the (a') at least one acrylic resin is prepared by polymerizing, as monomers, at least one selected from the group consisting of isobornyl (meth)acrylate, dicyclopentadiene (meth)acrylate, isobornyl oxyethyl (meth)acrylate, dicyclopentenyl (meth) acrylate, and cyclohexyl (meth)acrylate.

17. A fixing member for an image forming apparatus, the fixing member being formed by polymerizing
(a') at least one acrylic resin selected from compounds represented by a general formula (2) below in which a ratio [A]/([A]+[B]) is from 80% to 100%, where [A] represents a molar content of hydroxyl groups of side chains having less than 10 carbon atoms and [B] represents a molar content of hydroxyl groups of side chains having 10 or more carbon atoms: and a hydroxyl value is from about 70 mg KOH/g to about 400 mg KOH/g, General formula (2)

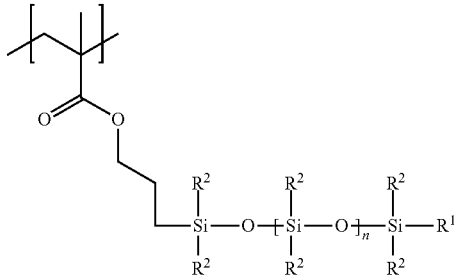

where $R^1$ represents an amino group, a hydroxyl group. a methoxy group, or an ethoxy group; $R^2$ represents a methyl group. aphenyl group, or an ethyl group; and n is from 3 to 1,000; and
(b) an isocyanate,
wherein the fixing member has a Martens hardness of from 1 N/mm$^2$ to 200 N/mm$^2$ at 150° C. and a recovery rate of from 80% to 100% at 150° C.

18. An image forming apparatus comprising the fixing member according to claim 17.

* * * * *